Figure 1:
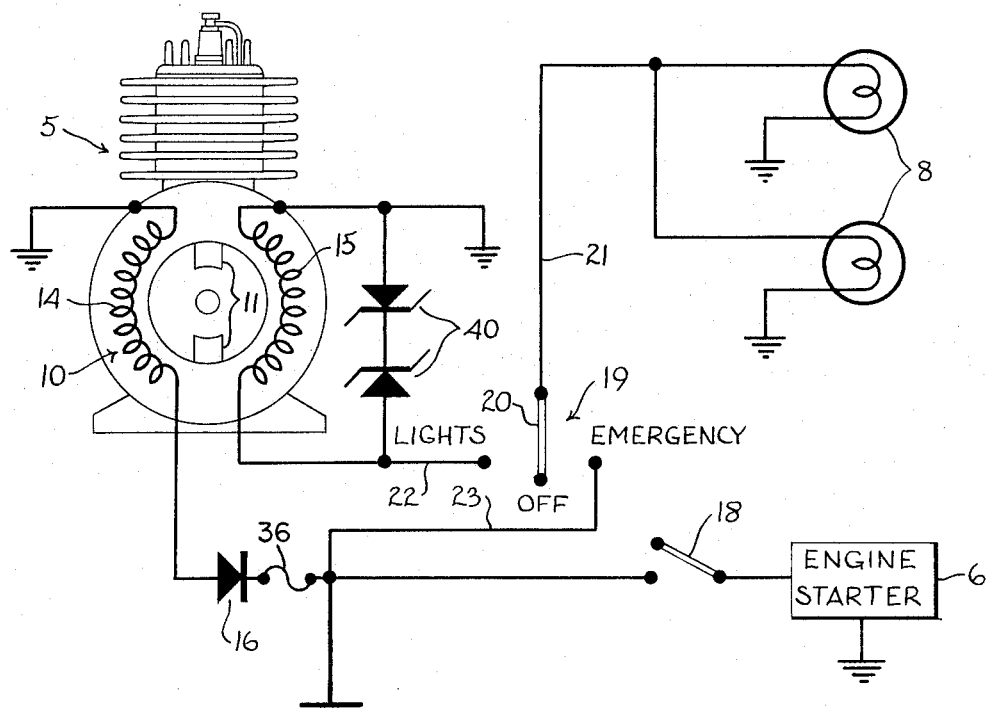

United States Patent

Harkness

[15] 3,671,851
[45] June 20, 1972

[54] ELECTRICAL SYSTEM FOR TRACTOR POWERED BY MAGNETO IGNITION ENGINE

[72] Inventor: Joseph R. Harkness, Germantown, Wis.

[73] Assignee: Briggs & Stratton Corporation, Milwaukee, Wis.

[22] Filed: Sept. 9, 1970

[21] Appl. No.: 70,669

[52] U.S. Cl. ............................322/90, 307/10, 320/68
[51] Int. Cl. .....................................................H02p 9/00
[58] Field of Search.................322/90; 307/10 LS; 320/68

[56] References Cited

UNITED STATES PATENTS

| 3,377,486 | 4/1968 | Benezech | 322/90 X |
| 3,530,366 | 9/1970 | Schwarm | 322/90 X |
| 3,029,378 | 4/1962 | Carlsson | 322/90 |

FOREIGN PATENTS OR APPLICATIONS

| 759,885 | 8/1955 | Great Britain | 322/90 |
| 922,970 | 4/1963 | Great Britain | 322/90 |

*Primary Examiner*—Benjamin Dobeck
*Attorney*—Ira Milton Jones

[57] ABSTRACT

An alternator driven by a magneto ignition engine has separate windings for battery charging and for lights. The battery charging winding is at all times connected with a storage battery through rectifier means and is designed for a maximum engine rpm output that will not harm the battery even when it is fully charged. The lights are normally energized only from the light winding, but switch arrangements are disclosed for energizing the lights from the battery when the engine is not running.

5 Claims, 2 Drawing Figures

INVENTOR
Joseph R. Harknes
By Ira Milton Jones
ATTORNEY

ELECTRICAL SYSTEM FOR TRACTOR POWERED BY MAGNETO IGNITION ENGINE

This invention relates to electrical systems for riding tractors powered by internal combustion engines, and the invention is more particularly concerned with a tractor electrical system that comprises lights mounted on the tractor, an electric starter for the tractor engine, a storage battery for energizing the starter, and an alternator which is driven by the engine and which provides a source of current for the electrical system.

When a storage battery is used in conjunction with an internal combustion engine, as a source of current for a starter for the engine, the storage battery should be recharged after each start, and it is of course preferable that the source of charging current be a dynamoelectric machine driven by the engine. An alternator, because it has no commutator or brushes, is less expensive and more reliable than a d.c. generator, even though the alternator must be connected with the battery through a rectifier by which its a.c. output is converted to unidirectional current. Heretofore the connections between the generator or alternator and the battery have usually also comprised a voltage regulator that prevented excessive charging current from being applied to the battery when the battery was at or near its fully charged condition.

In the smaller, garden type riding tractors powered by single-cylinder gasoline engines, an electric starter and a storage battery have become almost standard equipment, and headlights are frequently desired by the purchasers of such units. THe voltage regulator in such a tractor installation must perform substantially the same functions as the voltage regulator for a much higher horsepower machine, and it should be no less sturdy and dependable, but both size and cost are especially important considerations in relation to the smaller riding tractors and therefore much effort has been devoted to achieving a voltage regulator for such tractors that will meet the criteria of minimal cost, great compactness and utmost reliability.

The present invention solves the problem of obtaining compactness, reliability and low cost by an expedient which completely eliminates the need for a voltage regulator in a small tractor electrical system without sacrificing any of the other qualities and characteristics that are considered essential in an electrical system for such a machine.

Hence it can be said to be the general object of this invention to provide an electrical system for a small riding tractor powered by an internal combustion engine, which system comprises all of the essentials, namely, an electric starter for the engine, a storage battery for the starter, lights, and an alternator driven by the engine for charging the battery and energizing the lights; but which system has no voltage regulator and is therefore simple, compact and inexpensive.

Among the voltage regulators heretofore used with small tractor electrical systems were some that enabled the battery to discharge itself through the alternator windings when the engine was shut down under certain conditions. While regulators having this deficiency were not common, and battery discharge occurred with them only under somewhat unusual circumstances, the problem was inherent in their design rather than being due to faulty manufacture, and consequently the possibility of such inadvertent discharge of the battery is one that must be considered in connection with any electrical system that provides for charging a battery from an engine driven dynamoelectric machine. With this in mind, it is another object of the present invention to provide an electrical system in which the battery cannot, under any circumstances, discharge through an alternator winding after engine shutdown.

It is also an object of this invention to provide an electrical system of the character described, comprising an electrical load, such as head lights, normally used only when the engine is running, a storage battery, and an engine driven alternator for energizing the load and charging the battery, wherein the battery is not discharged by the load if it is switched on at a time when the engine is idling, but which permits the load to be energized even when the battery is removed or disconnected from the system.

With these observations and objectives in mind, the manner in which the invention achieves its purpose will be appreciated from the following description and the accompanying drawings, which exemplify the invention, it being understood that such changes in the specific apparatus disclosed herein may be made as come within the scope of the appended claims.

Figure 2:
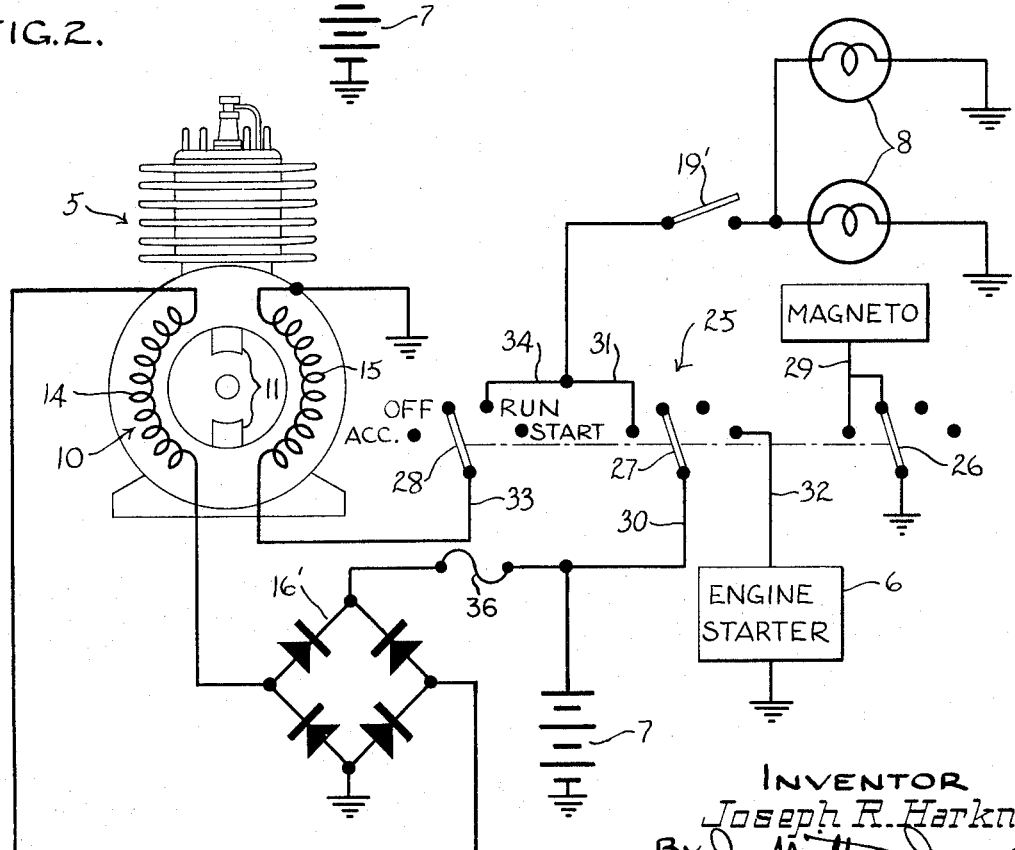

The accompanying drawings illustrate two complete examples of embodiments of the invention constructed according to the best modes so far devised for the practical application of the principles thereof, and in which:

FIG. 1 is a diagrammatic view of an electrical system for a small riding tractor, embodying the principles of this invention; and FIG. 2 is a generally similar view but illustrating a modified embodiment of the invention.

Referring now to the accompanying drawings, the electrical system of this invention is intended for a small riding tractor of the type powered by a single-cylinder engine 5. Such an engine is almost invariably equipped with a magneto ignition system, and therefore no external source of ignition current is required for it.

In general the electrical system of this invention comprises an electric starter 6 for the engine, a storage battery 7 for energizing the starter, an electrical load, shown as comprising a pair of headlights 8 mounted on the front of the tractor, and switch means, described hereinafter, for controlling energization of the load and the starter.

THe primary source of energizing current for the electrical apparatus is an alternator 10 that is driven by the engine. The rotor of the alternator 10 comprises permanent magnet means 11 carried by the engine flywheel to rotate therewith. Its stator comprises two separate and independent windings 14 and 15 which can be wound on a generally conventional core (not shown) of magnetically permeable material.

It is a feature of the present invention that one stator winding 14 is permanently connected with the battery 7 through rectifier means 16, while the other winding 15 is intended to supply energizing current to the lights whenever the engine is operating. Furthermore, the winding 14 is so designed that with the engine running at its highest speed, the current from said winding will not be so high as to be excessive for a fully charged battery. Hence the battery is being charged from the winding 14 whenever the engine is running, but is never subjected to excessive current after it is fully charged.

As shown in FIG. 1 the rectifier means 16 can comprise a single diode rectifier, connected in a series circuit with the winding 14 and the battery 7 to provide half-wave rectification. Alternatively, it could comprise, as illustrated in FIG. 2, a rectifier bridge network 16' comprising four diodes and providing full wave rectification. It will be appreciated that the full wave rectifier, although more expensive, makes for a more compact alternator winding 14 inasmuch as it allows unidirectional charging current to flow to the battery during both phases of the cycle of a.c. induced in that winding, whereas the half-wave rectifier requires a somewhat high voltage across the winding 14 to insure adequate battery charging.

When the engine is shut down, the rectifier means of either embodiment of the invention blocks flow of current from the battery back through the winding 14; hence the battery cannot under any circumstances discharge itself by that route.

A simple on-off starting switch 18, connected in a series circuit with the battery and the engine starter, can provide for control of starter energization.

The winding 15 can be designed to provide the rated energizing current for the lights 8 or other load at the normal rated operating speed of the engine. Note that the lights are thus normally energized with a.c. Obviously if the load were a d.c. apparatus, such as an electric clutch, suitable rectifier means would be connected in the circuit comprising the load and the winding 15.

If the winding 15 is designed to provide the normal energizing circuit for its load at the normal running speed of the engine, the voltage across the load will be at lower than the rated value when the engine runs at lower speeds. With a load circuit comprising headlights, as shown, the lights would then burn more or less dimly at the slower engine speeds. For substantially uniform light intensity at all engine speeds, the winding 15 can be designed to provide the normal rated voltage at the lowest expectable operating speed of the engine, and a pair of zener diodes 40, connected back-to-back, can be shunted across that winding. At the higher engine speeds the zener diodes in effect shunt the excess current across the winding 15 so that only the rated voltage is applied to the load.

Suitable switch means connected in series with the winding 15 and the lights enable the lights to be turned on and off.

Energization of the lights can be controlled by means of a three position switch 19, as illustrated in FIG. 1. The movable contactor 20 of that switch is connected with the lights by means of a conductor 21. One of the stationary contacts of the switch 19 is connected with one end of the winding 15 by means of a conductor 22; its other stationary contact is connected with the positive terminal of the battery 7 by means of a conductor 23. Of course the lights, the other end of the winding 15 and the negative terminal of the battery are all grounded to the tractor frame to complete the circuit. When the movable contactor 20 is engaged with the first mentioned contact, it completes a circuit for the lights by which they are energized from the winding 15. When the contactor 20 is engaged with the other contact the lights are energized from the battery, to provide for their emergency use when the engine is not running. In a middle position of the switch contactor 20 the lights are off.

In many cases it is unnecessary to provide for operation of the lights when the engine is not running. In that event the switch 19 could be a simple two-position on-off switch, omitting the battery connection 23 as well as the switch contact connected therewith.

Since the battery is discharged when the lights are connected with it, even if the engine is running, the switch 19 should not be left in the "emergency" position for any extended period of time. The circuit illustrated in FIG. 2 avoids any possibility that the lights might be inadvertently energized from the battery during engine operation. To this end it comprises a three-gang four position switch unit 25 that has three movable contactors 26, 27 and 28 which are insulated from one another but which are constrained to rotate in unison to each of four defined positions. THe switch unit 25 will be recognized as a generally conventional ignition switch having "accessory," "off," and "run" and "start" positions.

One movable contactor 26 of the switch unit 25 is connected with the tractor frame, to ground it. In its "accessory" and "off" positions the contactor 26 engages contacts which are connected with a magneto grounding conductor 29 so that it grounds the magneto and renders the engine ignition system inoperative. In its other two positions the contactor 26 engages blank contacts.

The movable contactor 27 of the switch unit 25 is permanently connected with the battery by means of a conductor 30. The contact that it engages in its "accessory" position is connected with the light circuit by means of a conductor 31 to provide for energizing the lights from the battery when the engine is shut down. In its "start" position the contactor 27 engages a contact that is connected, by means of a conductor 32, with the engine starter, to provide for energization of the starter from the battery. The contactor 27 engages blank contacts in its "off" and "run" positions.

The contactor 28 is permanently connected with the ungrounded side of the winding 15 by means of a conductor 33, and in its "run" position it engages a contactor which is connected with the light circuit by means of a conductor 34. The contactor 28 engages blank contacts in its other three positions.

The light circuit is controlled by a switch 19', one side of which is connected with the conductors 31 and 34 and the other side of which is connected with the ungrounded terminals of the lights.

For protection of the rectifier against reversed battery polarity a fuse 36 can be incorporated between the rectifier and the battery.

As a specific example of a 12-volt system embodying the principles of this invention which was found very successful in practice, a stator core intended for a prior voltage regulator electrical system was rewound to provide a battery charging winding 14 having three coils, each wound around one pole of the stator core and each comprising 90 turns of No. 25 heavy insulation coated magnet wire. This winding was rated at 2 ½ amps. at the normal 3,600 rpm operating speed of the single-cylinder engine driving the alternator, and it began to charge at an engine speed of 1,000 rpm. Although a run-down battery charged less rapidly with this arrangement than with a voltage regulator system (which can provide a higher charging rate), there was less chance of the battery being run down, since normally it was used only for engine starting. A full-wave rectifier was used with this winding. Its output was not high enough, even at maximum 4,000 rpm engine speed, to be harmful to a fully charged battery.

The winding 15 comprised five coils of 21 turns each of No. 18 heavy insulation coated magnet wire. Since this winding was designed to provide the rated voltage to the light circuit at the rated engine speed, the zener diodes 40 were not used. The lights energized from it, which normally drew a total of about 5 amps., began to provide some light at about 1,000 engine rpm and were at normal brilliance at around 3,000 rpm. With only one light operating, and with the engine running at its top speed of 4,000 rpm, the voltage across the operating light did not exceed 16 volts, which was not so high a voltage as to have a markedly adverse effect upon its life.

As compared with prior regulated voltage systems, the electrical system of the present invention has several advantages in addition to cost. The voltage regulators heretofore used with small engine installations were not temperature compensated, although a storage battery requires a higher charging current when cold than when warm. In cold weather because of the uncompensated regulation, the battery charging rate tended to drop before the battery was fully charged. With prior systems, moreover, the battery often tended to be discharged by use of the lights, even when the engine was running. At engine speeds of around 2,400 rpm the regulated alternator had an output of only about 3.5 amps., and this was too low a current to support the lights. And in cold weather conditions, even when the engine was operating at normal speeds of around 3,600 rpm, the lights drew so much of the available current that not enough was left for charging the battery, so that a few low temperature starts could fully discharge it. With the system of the present invention, the battery will always be receiving a charge when the engine is running, regardless of whether or not the lights are being used; and its charging current, moreover, will not vary with use or non-use of the lights nor to any appreciable extent with temperature.

Another advantage of the system of the present invention is that it permits the use of the lights when the battery is removed for some reason. With most prior regulator systems the operator was instructed to remove the fuse, for safety reasons, whenever he removed the battery, and if he did so he could not operate the lights when using the tractor, even though he was able to start the engine manually. With the present system, wherein the light and battery circuits are completely separate, the lights can be used when the battery is removed, as long as the engine is operating.

It will be obvious that the alternator can comprise more than one load energizing winding like the winding 15, to provide for energization of, e.g., and electric clutch in addition to headlights. In that case, each load winding would of course be designed for the particular ratings of the load it is intended to energize, utilizing, where necessary, rectifier and back-to-back zener diode arrangements like those herein disclosed.

From the foregoing description taken with the accompanying drawing will be apparent that this invention provides a simple, inexpensive and advantageous electrical system for a small riding tractor powered by an internal combustion engine.

Those skilled in the art will appreciate that the invention can be embodied in forms other than herein disclosed for purposes of illustration.

The invention is defined by the following claims:

1. An electrical system for a riding-type tractor powered by a magneto ignition engine, which electrical system comprises a starter for the engine, a storage battery for energizing the starter, and another electrical load circuit, said electrical system being characterized by:
   A. an alternator rotor comprising permanent magnet means carried by the flywheel of the engine;
   B. an alternator stator having
      1. means comprising a first winding of impedance high enough to provide for a current output at normal engine speeds which is large enough to provide for a current output at normal engine speeds which is large enough to harm the battery if continuously applied to the battery when it is fully charged, and
      2. means comprising a second winding of sufficiently lower impedance to provide for a current output at normal engine speeds which is large enough to energize said other load circuit;
   C. rectifier means connecting the first winding with the battery so that the battery is supplied with unidirectional current at all times that the engine is running but whereby the battery is prevented from discharging into the first winding when the engine is stopped; and
   D. circuit means for connecting the second winding with said other load circuit independently of the battery.

2. The electrical system of claim 1, further characterized by said circuit means comprising:
   A. a switch movable selectively to each of three positions and having
      1. first contact means connected with said other load circuit,
      2. second contact means connected with said other load circuit,
      3. third contact means connected with the battery;
   B. said first contact means being arranged for alternative engagement with said second and third contact means so that
      1. in a first position of said switch the first contact means cooperates with the second contact means to connect said other load circuit in a normal energizing circuit with the second winding,
      2. in a second position of said switch the first contact means cooperates with the third contact means to connect said other load circuit in an emergency energizing circuit with the battery, and
      3. in a third position of said switch said other load circuit is unenergized.

3. In a riding-type tractor powered by an internal combustion engine, and which is equipped with an electric starter, a storage battery that provides a source of current for the starter, a switch for controlling a connection between the battery and the starter, and another electrical load circuit, the improvement which comprises:
   A. an alternator having
      1. a rotor carried by the flywheel of the engine, and
      2. a stator having a pair of separate current generating means,
         a. one of said current generating means comprising winding means having an impedance high enough so that the current available therefrom at normal engine running speeds is not high enough to harm the battery when the same is fully charged, and
         b. the other current generating means comprising a second winding means having a substantially lower impedance and thus providing for a current output at normal engine speeds which is high enough to energize said other load circuit;
   B. means comprising rectifier means connecting said one winding means with the battery and through which the alternator functions to charge the battery with unidirectional current whenever the engine is running, but which prevents discharge of the battery through said one winding means when the engine is stopped; and
   C. circuit means for connecting said other winding means for the other load circuit independently of the battery.

4. The riding type tractor of claim 3 wherein said circuit means comprises a second switch, further characterized by:
   the second switch being a double-throw three-position switch connected and arranged to provide for connection of the other load circuit alternatively
      1. with said second winding means when the engine is operating, or
      2. with the battery when the engine is not operating, or
      3. with neither said second winding means nor the battery when energization of the other load circuit is not desired.

5. The riding type tractor of claim 4 wherein said second winding means also provides for a current output at substantially lower than normal engine speeds which is high enough to energize said other load circuit, further characterized by:
   a pair of zener diodes connected back-to-back and in shunt across said second winding means to prevent excessive voltage from being applied across the other load circuit at the higher engine speeds.

* * * * *

UNITED STATES PATENT OFFICE
CERTIFICATE OF CORRECTION

Patent No. 3,671,851        Dated   June 20, 1972

Inventor(s)  Joseph R. Harkness

It is certified that error appears in the above-identified patent and that said Letters Patent are hereby corrected as shown below:

Claim 2 (original Claim 5)

A(2)   should read:   Second contact means connected with the second winding, and Signed and sealed this 17th day of October 1972.

(SEAL)
Attest:

EDWARD M. FLETCHER, JR.
Attesting Officer

ROBERT GOTTSCHALK
Commissioner of Patents